United States Patent [19]

Kalpin et al.

[11] 3,934,632
[45] Jan. 27, 1976

[54] TRACTION-INCREASING DEVICE

[76] Inventors: Thomas G. Kalpin, 151 Jackson Ave.; Howard J. Ross, 56 Leonhardt Ave., both of North Tonawanda, N.Y. 14120

[22] Filed: Apr. 15, 1974

[21] Appl. No.: 460,963

[52] U.S. Cl. ............... 152/210; 152/208; 301/41 R
[51] Int. Cl.² .................................... B60C 11/00
[58] Field of Search........... 301/41 R; 152/210, 208, 152/211, 209 R, 209 D

[56] References Cited
UNITED STATES PATENTS

| | | | |
|---|---|---|---|
| 3,396,772 | 8/1968 | McCarroll | 152/210 |
| 3,407,860 | 10/1968 | Mossberg | 152/210 |
| 3,480,062 | 11/1969 | Hillhouse | 152/210 |
| 3,717,189 | 2/1973 | Gutshall | 152/210 |
| 3,818,966 | 6/1974 | Baum | 152/210 |

Primary Examiner—Robert B. Reeves
Assistant Examiner—D. W. Keen
Attorney, Agent, or Firm—Christel & Bean

[57] ABSTRACT

A device for inserting or moulding into a tire tread to increase traction and stabilize the tread comprising an elongated body having an end surface and installed in the tire so that the end surface is spaced inwardly of the tread surface in a manner defining a recess. As the tire moves along a supporting surface such as a road, the portion containing the device is brought into and out of maximum stress thereby varying the volume of the recess in a manner creating suction therein which increases traction between the tire and road. The device is formed of material having wear characteristics substantially similar to the tire material, for example thermosetting plastic material which preferably is filled with iron powder. The device has a frustoconical body terminating in the end surface and having a relatively larger diameter base portion at the opposite end for proper securement in the tire.

13 Claims, 9 Drawing Figures

U.S. Patent   Jan. 27, 1976   3,934,632
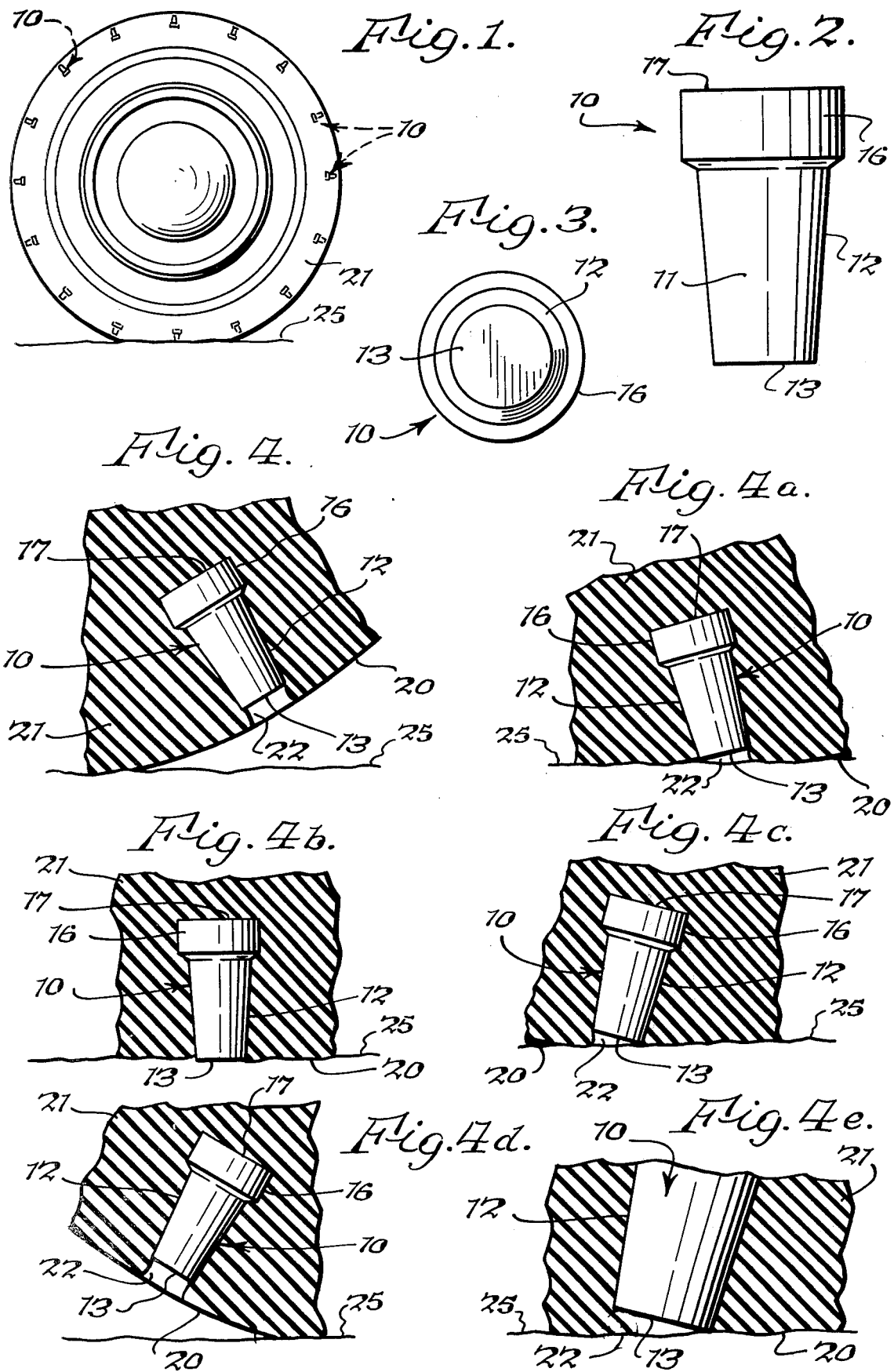

3,934,632

TRACTION-INCREASING DEVICE

BACKGROUND OF THE INVENTION

This invention relates to the art of vehicle traction devices such as rubber tires, and more particularly to a new and improved device for inserting into a tire surface or tread to increase tire stability, traction and tire mileage.

Various constructions and designs have been employed in tires heretofore available. Development of tire construction and design has been oriented toward increased traction for starting, stopping and avoidance of sideslip as well as increase of tire mileage. Current tire production involves syping or partial slicing of the tread of the tire so that additional edges of rubber are brought into contact with the road to relieve hydroplaning on a wet surface or riding on melted rubber on a dry surface in attempting to make maximum use of the abrasive effect of road surface on the tire. The effect of the syping is greatest when the tire is rolling, being diminished if the brakes are applied so that the vehicle wheel is locked.

Another approach to increasing traction has been insertion in the tire tread of hardened metallic studs which project from the tire surface and are intended to act as lugs or cleats to dig into the road surface. The erosive effect on the road surface has resulted in prohibition of use of studded tires in some localities.

The primary object of this invention is to provide a new and improved device for inserting into a tire surface or tread for the purpose of increasing traction.

It is a further object of this invention to provide a device which stabilizes tire tread with resultant greater vehicle control on starting, stopping and turning.

It is a further object of this invention to provide such a device which will not penetrate the cord body or otherwise damage the tire into which is it inserted.

It is a further object of this invention to provide such a device which will not abrade or otherwise damage road surfaces.

It is a further object of this invention to provide such a device which stabilizes tire tread with resultant increase of tire mileage.

It is a further object of this invention to provide such a device which accomplishes the foregoing objectives in a manner which does not cause noise during the operation thereof.

It is a further object of this invention to provide such a device which is easy and economical to manufacture and convenient to install in a tire.

The present invention provides a device for installation in the tread or wear surface of a traction element such as a vehicle tire to increase the traction and stability thereof. The device comprises a body having an end surface and which is installed in the traction element so that the end surface is spaced inwardly of the tread surface in a manner defining a recess. The volume of the recess is varied as the traction element moves along a supporting surface stressing the portion of the traction element containing the device in a manner creating suction in the recess, which suction increases traction between the traction element and the supporting surface. The device is shaped in a manner such that it is held securely in the body of the traction element while at the same time damage to the body of the traction element is prevented. The device is formed of a material having wear characteristics substantially similar to the material of the traction element, and the material preferably is plastic having a powder metal filler.

The foregoing and additional advantages and characterizing features of the present invention will become clearly apparent from a reading of the ensuing detailed description together with the included drawing wherein:

BRIEF DESCRIPTION OF THE DRAWING FIGURES

FIG. 1 is an elevational view of a conventional vehicle wheel showing a number of devices according to the present invention inserted into the tire of the wheel to increase traction;

FIG. 2 is an elevational view of the device according to the present invention;

FIG. 3 is a plan view of the device of FIG. 2;

FIG. 4 is a fragmentary sectional view of a tire body showing the device of the present invention installed therein;

FIGS. 4a–4d are views similar to FIG. 4 showing successive stages of operation of the device of the present invention; and FIG. 4e is a view similar to FIG. 4c but showing a portion thereof on an enlarged scale.

DETAILED DESCRIPTION OF THE ILLUSTRATED EMBODIMENT

Referring now to FIG. 1, there is shown a conventional vehicle wheel and a number or plurality of devices 10 according to the present invention installed in the surface or tread of a tire 21 fitted on the wheel to increase traction. As shown in FIGS. 2 and 3, device 10 is generally elongated and includes a body portion 11 which preferably is generally frusto-conical in shape thereby defining a tapering outer surface 12. Body portion 11 terminates at one end in an end face 13 which preferably is planar and disposed at substantially a right angle to the longitudinal axis of body portion 11. The opposite end of body portion 11 meets a base 16 which preferably is disc-shaped or tablet-shaped having a diameter slightly greater than the maximum diameter of body 11 and including an end face 17 which preferably is planar and disposed at substantially a right angle to the longitudinal axis of body portion 11. Thus, the cross-sectional area of body 11 increases along the longitudinal axis thereof and away from end face 13.

The following dimensions which could be applied to device 10 are given by way of example for purposes of illustration, it being noted that various sizes and altered dimensions will be required for various depths of tire tread. It should be noted also that the composition of the device 10 may be varied in accordance with varying compositions used in tire manufacture. For average size pneumatic passenger car tires the overall length of device 10, measured between end faces 13 and 17 can be about 0.593 inch. The minimum diameter of body portion 11, which is equal to the diameter of end face 13, can be about 0.187 inch. The maximum diameter of body portion 11, measured adjacent base portion 16, can be about 0.265 inch. The diameter of base portion 16, which is equal to the diameter of end face 17, can be about 0.350 inch, and the axial length of base 16 can be about 0.062 inch.

Device 10 is formed from a material which has approximately the same wear characteristics as the material of which the tire is formed so that device 10 wears substantially to the same extent as the tire, for a purpose which will be described presently. Furthermore, the material should be of a density or hardness greater than that of the traction element to give the traction element a factor of greater stability. The material may be a thermosetting plastic material, and it has been found that filling the plastic material with metal powder, such as iron powder, during forming or molding thereof improves the overall performance of device 10. Other fillers such as wood flour and glass fibers have been found to perform satisfactorily. A typical one of the thermosetting plastic group is phenolic resin, although other resins can be used. By way of further example, a device 10 molded or otherwise formed from an iron filled plastic commercially available from the Durez Division of the Hooker Chemical Corporation under the designation Durez No. 24067 was found to perform satisfactorily. The size and/or shape of device 10 may vary in accordance with the tire in which it is to be used. The composition of the plastic material may be varied to approximate the wear factor of the tire and to accommodate to different conditions of roads or other surfaces encountered in use.

FIG. 4 illustrates the manner in which device 10 of the present invention is installed in a tire 21. An elongated opening or passage is provided through the peripheral or tread surface 20 and into the body of tire 21 in a generally radial direction. The opening is of sufficient depth so that when device 10 is inserted, or placed by moulding, as shown in FIG. 4, end face 13, after a minimal number of revolutions of a vehicle mounted tire, will be spaced inwardly of surface 20 thereby leaving a recess or passage designated 22. With device 10 inserted in a tire in the position shown in FIG. 4, the relatively large area of flat end face 17 prevents further penetration of device 10 in an inward direction, and base 16 together with the tapering surface 12 retains device 10 in the tire. A plurality of devices 10, sufficient to provide the effects desired, may be installed in a similar manner, circumferentially of the tire, and in each tread section across the face of the tire.

FIGS. 4a–4d illustrate the operation of device 10 as the tire in which it is installed moves along a road surface 25. FIGS. 4a–4d depict rotation of the tire in a clockwise direction and operation of device 10 as it moves into and out of proximity with the road surface 25. FIG. 4a illustrates compression of the air within recess or chamber 22 as the portion of the tire containing device 10 comes into contact with road surface 25. Further rotation of the tire brings device 10 into the position of FIG. 4b where the longitudinal axis of device 10 is substantially perpendicular to road surface 25. At this position all or substantially all of the air previously trapped in recess 22 is expelled due to the fact that the volume of recess 22 is reduced to zero or substantially zero. End face 13 of device 10 will be very close to or in contact with road surface 25 in this position of maximum stress or load on the portion of the tire containing device 10. FIG. 4a illustrates the slight radial inward movement of device 10 as the tire rotates a short distance further thereby partially relieving the stress in the region containing device 10. In this position, the volume of recess 22 begins to grow thereby creating a suction and vacuum gripping action on the road surface 25. This is illustrated in further detail by the enlarged view of FIG. 4e wherein the suction in recess 22 increases traction between the tread or wear surface of tire 21 and surface 25. FIG. 4d shows the position of device 10 after further rotation of the tire where stresses in the region of device 10 are completely relieved and recess 22 has returned to its original volume. Thus, as the traction element or tire 21 moves along the surface, the volume of recess 22 is varied in a manner creating suction therein and increasing the traction between the tread surface of the traction element and road surface 25. In addition to the foregoing, the piston type action of device 10 provides a cleaning action for recess 22 on each revolution of the tire. The foregoing operations occur with each one of the plurality of devices 10 installed in a tire, and these operations occur as to each device 10 during each rotation of the tire as it moves along the road surface.

The tire stabilizing device 10 of the present invention provides a maximum coefficient of friction between a tire in which it is installed and road surfaces under dry, wet, muddy, snow-covered or iced conditions. It provides greater safety through increased efficiency in starting, stopping or braking, accelerating, decelerating, cornering and in sideslip prevention. The device 10 of the present invention is constituted and designed so that after a minimal number of revolutions of the vehicle mounted tire, the exposed surface of the device will normally be recessed to some extent below the tread surface, coming in contact with the road only when the area of the tire in which it is inserted is in contact with the road, the device not being intended to act as a lug or cleat. With the plastic material of device 10 having a wear ratio similar to that of the tire, the length of device 10 is reduced in direct proportion to the wear of the tire tread under substantially uniform conditions of tire pressure and vehicle load. This, in turn, maintains the inward spacing of end face 13 from tire surface 20 thereby maintaining the recess 22. Actually, the wear characteristics of device 10 and the tire can be somewhat different so long as once device 10 has worn to the point where recess 22 is provided, device 10 thereafter wears uniformly with the tire material to maintain the relationship between end face 13 and the tire surface 20. The forming of recess 22 provides an additional gripping effect due to the suction action resulting from the retraction of device 10 inwardly of the surface 20 of the tire tread when device 10 has passed the direct point of contact with the road surface or pavement. Device 10 compresses air trapped in recess 22 as the point of maximum stress is approached, and this compressed air expells water from the recess and is believed to generate heat which tends to melt ice which may be present. The device 10 reinforces, strengthens and stabilizes the tread to avoid bending and sway, i.e.: damping the elastic action of the rubber of the tire trend, and has the effect of providing more stable operation and control of the vehicle and has the further effect of reducing the rate of tire wear thereby increasing tire mileage.

Device 10 of the present invention serves as a tire stabilizer insert for pneumatic rubber tires used on passenger cars, trucks, airplanes and other vehicles, and for solid rubber tires used on industrial and heavy duty vehicles. The device also could have application to conveyor belts, treads, shoes and other traction members. It increases traction on slippery surfaces, stabilizes the operation and control of the vehicle under all operation conditions, and improves the tread wear of tires. The insert 10 counteracts the tendency of the tread to flatten or spread out under stress, in effect making the tread stand up, thereby enabling the tread to operate more effectively. Tests conducted on device 10 of the present invention indicate that it increases traction and stability while reducing "fish-tailing" when the vehicle brakes are pumped for stopping on all surfaces, whether wet or dry and of whatever composition. The tendency of tire stabilizer inserts 10 to slightly recede and form cupping actions around the tire creates a suction effect which reduces hydroplaning and enhances traction. The optimum in performance and safety is derived from the use of tire stabilizers of the present invention in tires on all wheels of a vehicle. In addition, tires equipped with tire stabilizers 10 of the present invention have been found to provide improved traction and handling under all road surface conditions over tires equipped with metallic lugs, cleats or carbide tipped studs. The differential is most pronounced on icy roads when temperatures are below 0°F. Furthermore, tires equipped with device 10 of the present invention exhibited superior tread wear and an even wear pattern. The device 10 is intended for use in tires on all wheels of a vehicle, and in passenger cars has been found to be particularly advantageous when used in the front tires, for braking and for stability in handling, cornering and turning.

As previously described, device 10 of the present invention consists of a plastic frusto-conical shaped stabilizer with slightly tapered sides, having a somewhat larger base to securely hold the stabilizer in the tire and to prevent damage to the tire. In particular, the tapered surface 12 of body 11 contributes to throw-out resistance since it results in a more effective grip of the tread material on device 10 than is found with metal studs. The recessing effect results in eliminating twisting or bend-over of the device on the longitudinal axis and yields even tire wear, whereas with metallic lugs, cleats or carbide tipped studs, the twisting or bend-over action caused by the protrusion of the metallic lug, cleat or carbide tipped stud causes an irregular and uneven tire wear pattern, weakening the grip of the tire on the metallic lug, cleat or carbide tipped stud so that throw out is much more prevalent. The thickness of base portion 16 gives effective anchorage of the base of device 10. Such thickness also eliminates any tendency of the base to cut into the tread material. Devices 10 can be installed across the entire face of the tire tread. Device 10 can be used in center tread sections as well as the outer sections and possibility of throw-out is practically eliminated, the device resisting throw-out not only because of the disc shaped base and the tapered shape but because of the recess effect. This is in contrast to the experience with metallic studs which are used only in the outer section of the tread due to excessive throw-out if used in center section of the tread.

The fact that stabilizer inserts 10 of the present invention do not protrude from the tire tread or peripheral surface results in elimination of damage to road surfaces. A further feature of this device is that the noise factor, encountered with metallic lugs, cleats or carbide tipped studs which protrude from the tire surface, is eliminated. In addition, installation of device 10 in conventional snow tires essentially does not increase the noise factor over that of the tread pattern.

It is therefore apparent that the present invention accomplishes its intended objects. While a single embodiment of the present invention has been described in detail, this is for the purpose of illustration, not limitation.

We claim

1. In a traction element such as a vehicle tire having a tread or wear surface, a device installed in the traction element body adjacent said tread surface for enhancing traction and stability, said device comprising a body having an end surface spaced inwardly of said tread surface in a manner defining a recess, the volume of said recess being reduced to substantially zero when said traction element is in a position on a supporting surface such as a road providing maximum stress on the portion of the traction element body containing said device, said recess returning to the original volume thereof as said traction element moves further on said supporting surface in a manner relieving stress on the portion of the traction element body containing said device whereby suction is created in said recess as it begins to return to the original volume thereof thereby increasing traction between said traction element and said supporting surface.

2. A device according to claim 1, wherein said device body is elongated and disposed in the traction element body so that in said position of maximum stress the longitudinal axis of said body is disposed generally perpendicular to said supporting surface.

3. A device according to claim 1, wherein said traction element is a vehicle tire and wherein a plurality of devices are installed in the tire circumferentially thereof.

4. A device according to claim 1, wherein said traction element is a vehicle tire and wherein said device body is elongated and disposed in the tire so that the longitudinal axis of said device is generally coincident with a radius of the tire.

5. A device according to claim 1, wherein the body thereof is formed from a material having substantially the same wear characteristics as the material of said traction element.

6. A device according to claim 1, wherein said body is elongated and said end face is disposed in a plane substantially perpendicular to the longitudinal axis of said body, said body increasing in cross-sectional area in a direction along said body away from said end face, said body terminating at the other end in an enlarged base portion.

7. A device according to claim 6, wherein said body is generally frusto-conical in shape and said base portion is generally disc-shaped.

8. A device according to claim 1, wherein said body is elongated having an outer surface which tapers outwardly in a direction away from said end face in a manner such that the cross sectional area of said body increases along said body from said end face.

9. A device according to claim 1, wherein said body is elongated, with said end face at one end and a relatively larger base portion at the opposite end thereof.

10. A device according to claim 1, wherein the body thereof is formed from thermosetting plastic material.

11. A device according to claim 10, wherein said plastic material comprises phenolic resin material.

12. A device according to claim 10, wherein said plastic material is filled with metal powder.

13. A device according to claim 7, wherein said filler comprises metal powder.

* * * * *